Figure 1:
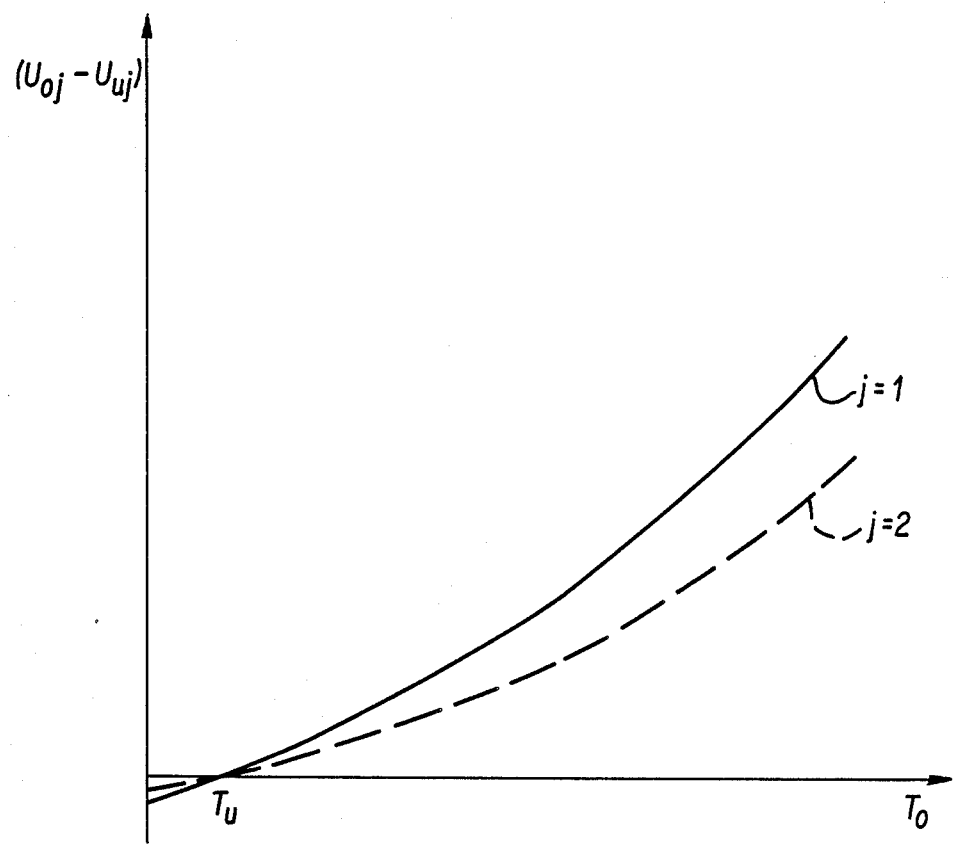

United States Patent [19]

Kienitz

[11] Patent Number: 4,880,314
[45] Date of Patent: Nov. 14, 1989

[54] PYROMETRIC MEASUREMENT PROCEDURE AND MULTI-CHANNEL PYROMETER

[75] Inventor: Ulrich Kienitz, Dresden, German Democratic Rep.

[73] Assignee: VEB Messgeraetewerk "Erich Weinert" Magdeburg, Betrieb des Kombinates VEB EAW Berlin-Treptow, Magdeburg, German Democratic Rep.

[21] Appl. No.: 875,125

[22] Filed: Jun. 17, 1986

[30] Foreign Application Priority Data

Jul. 30, 1985 [DD] German Democratic Rep. ... 279119

[51] Int. Cl.[4] .............................. G01J 5/56; G01J 5/52
[52] U.S. Cl. .................................. 374/129; 374/126; 374/2; 374/9; 364/557
[58] Field of Search ............... 374/121, 123, 126, 129, 374/9, 2; 356/43, 45; 364/557

[56] References Cited

U.S. PATENT DOCUMENTS

| | | | |
|---|---|---|---|
| 3,483,378 | 12/1969 | Murray | 374/129 |
| 3,610,592 | 10/1971 | Murray | 374/129 |
| 3,796,099 | 3/1974 | Shimotsuma | 374/129 |
| 4,433,924 | 2/1984 | Quinn III | 374/129 |
| 4,435,092 | 3/1984 | Iuchi | 356/43 |
| 4,465,382 | 8/1984 | Iuchi et al. | 374/126 |
| 4,466,748 | 8/1984 | Needham | 374/129 |
| 4,504,922 | 3/1985 | Johnson et al. | 364/557 |
| 4,592,002 | 5/1986 | Bozarth, Jr. et al. | 364/557 |
| 4,611,930 | 9/1986 | Stein | 374/126 |
| 4,634,294 | 1/1987 | Christol et al. | 374/129 |

FOREIGN PATENT DOCUMENTS

| | | | |
|---|---|---|---|
| 0659613 | 5/1965 | Belgium | 374/129 |
| 3115887 | 11/1982 | Fed. Rep. of Germany | 374/126 |
| 0162028 | 12/1980 | Japan | 374/9 |

Primary Examiner—William A. Cuchlinski, Jr.
Assistant Examiner—Thomas B. Will
Attorney, Agent, or Firm—Jordan and Hamburg

[57] ABSTRACT

A pyrometric measurement method and a multi-channel pyrometer for determining the temperature $T_o$ of surfaces with different emissivities by measuring the spectral signal voltages $U_j$ at $j=1$ to n effective wavelengths. The invention obtains, by infrared measurements at at least two effective wavelengths, information concerning the object temperature and the emissivity relationships actually existing for selected surface materials, such as those which are typical for a user. The spectral signal voltages $U_{ij}$ are ascertained as a function of the difference $U_{oj}-U_{uj}$ for a discrete number $i=1$ to n of surface materials differing in emissivity and the hypothetically possible spectral voltages $U_{oij}$ and, from these, the probable object temperature $T_o$ and the probable applicable surface material are determined from the measured spectral signal voltages $U_j$, using the functional relationship that has been established for each emissivity $\epsilon_{ij}$.

3 Claims, 2 Drawing Sheets

PYROMETRIC MEASUREMENT PROCEDURE AND MULTI-CHANNEL PYROMETER

AREA OF APPLICATION OF THE INVENTION

The invention relates to a pyrometric measurement procedure and a multi-channel pyrometer for determining the temperature $T_o$ of surfaces with different emissivities by measuring the spectral signal voltages $U_j$ for $j=1$ to n effective wavelengths.

CHARACTERISTICS OF THE KNOWN SOLUTIONS

In total radiation pyrometry, it is customary to estimate the emissivity of a test object or, by artificially increasing the emissivity, to decrease its effect on distorting the results of a contactless temperature measurement. However, the known methods permit the object temperature to be determined only approximately and/or require the test object surface or surroundings to be changed.

Various methods were therefore developed to achieve an emissivity-independent temperature measurement with the help of spectral- or band-radiation pyrometers by measuring the infrared radiation at more effective wavelengths.

A first group of methods presupposes a linear behavior of the emissivity. The simple and expanded ratio pyrometers, constructed on the basis of this assumption, decreases the measurement error only if this assumption actually is fulfilled. With real test objects however, a small deviation from the assumed emissivity distribution, due to the ratio formation of the pyrometer signals, leads to a larger measurement error than does the method of estimating the emissivity and subsequently measuring with a band-radiation pyrometer.

In German Offenlegungsschrift 1,648,233, a measuring procedure is proposed, which works in the high-temperature region and, after a calibration of the test object in question, takes variable emissivities into consideration by forming a temperature-invariant band radiation ratio signal. A disadvantage of this procedure is the sophisticated calibration of all possible emissivity relationships, since the measuring procedure otherwise leads to the calculation of a wrong object temperature.

Multi-channel pyrometers, with two or three channels are used to measure infrared radiation at several effective wavelengths. The infrared radiation of the test object passes through an optical system and reaches the inlets of the channels. The signal voltages $U_j$ of the $j=1$ to n channel-specific wavelengths are measured. For purposes of evaluating, a control computer is connected to the channels and a dialog unit is connected to the control computer. The functional relationship between the spectral signal voltages, $U_{oj}$ and $U_{uj}$, and the surface temperature $T_o$ and the ambient temperature $T_u$, calibrated using a black-body radiator, is stored in the control computer.

OBJECT OF THE INVENTION

It is an object of the invention to increase the reliability of the measurement in the high-temperature, as well as in the low-temperature range.

EXPLANATION OF THE ESSENCE OF THE INVENTION

The invention is directed to the provision of a method and apparatus for obtaining by infrared radiation measurements at at least two effective wavelengths, information concerning the object temperature and the emissivity relationships actually existing for selected surface materials, such as are typical for a user.

Briefly stated, in accordance with the invention, this object is achieved by ascertaining spectra signal voltages $U_{ij}$ a function of the difference $U_{oj}-U_{uj}$ for a discrete number $i=1$ to m of surface materials differing in emissivity and the hypothetically possible spectral voltages $U_{oij}$ and, from these, determining the probable object temperature $T_o$ and the probably applicable surface material from the measured spectral signal voltages $U_j$, using the functional relationship that has been established for each emissivity $\epsilon_{ij}$. From the known relationship $$U_{ij}=\epsilon_{ij}U_{oj}+(1-\epsilon_{ij})U_{uj}-U_{uj} \tag{1}$$

| wherein | $i = 1 \ldots m$ | surfaces differing in emissivity |
|---|---|---|
| | $j = 1 \ldots n$ | wavelengths |
| | o | surface |
| | u | surroundings | and for a measured spectral signal voltage $U_j$, it follows that the theoretically possible $$U_{oij}=U_j/\epsilon_{ij}+U_{uj} \tag{2}$$

in which, for $\epsilon_{ij}$, the relationship, previously determined by measurement, $$\epsilon_{ij} = \frac{U_{ij}}{U_{oj} - U_{uj}} \tag{3}$$

is inserted for all i. When the applicable emissivity ratios $\epsilon_{ij}$ are inserted, the scatter of the object temperatures, assigned to the $U_{oij}$ using the calibration line, is theoretically zero and practically small. The actual object temperature can be assigned with great certainty to the values with the least scatter, especially when the scatter of these values lies below a previously specified threshold value. To carry out the procedure, a multi-channel pyrometer with control computer and dialog unit(s) can inventively be used, in which a nonvolatile RAM, with the spectral signal voltages $U_{ij}$ as a function of $U_{oj}-U_{uj}$ for a discrete number $i=1$ to m of surfaces differing in emissivity in a manner typical for the user, is allocated in the memory to the control computer.

With such a configuration, real-time operation is possible, so that new measured values of the radiation can be dealt with continuously. The number of spectral measurement ranges necessary is determined primarily by the number of materials, which are to be differentiated, or by the behavior of their emissivity, as well as by the required reliability of identifying them.

EXAMPLE OF THE OPERATION

In the drawings

Figure 2:
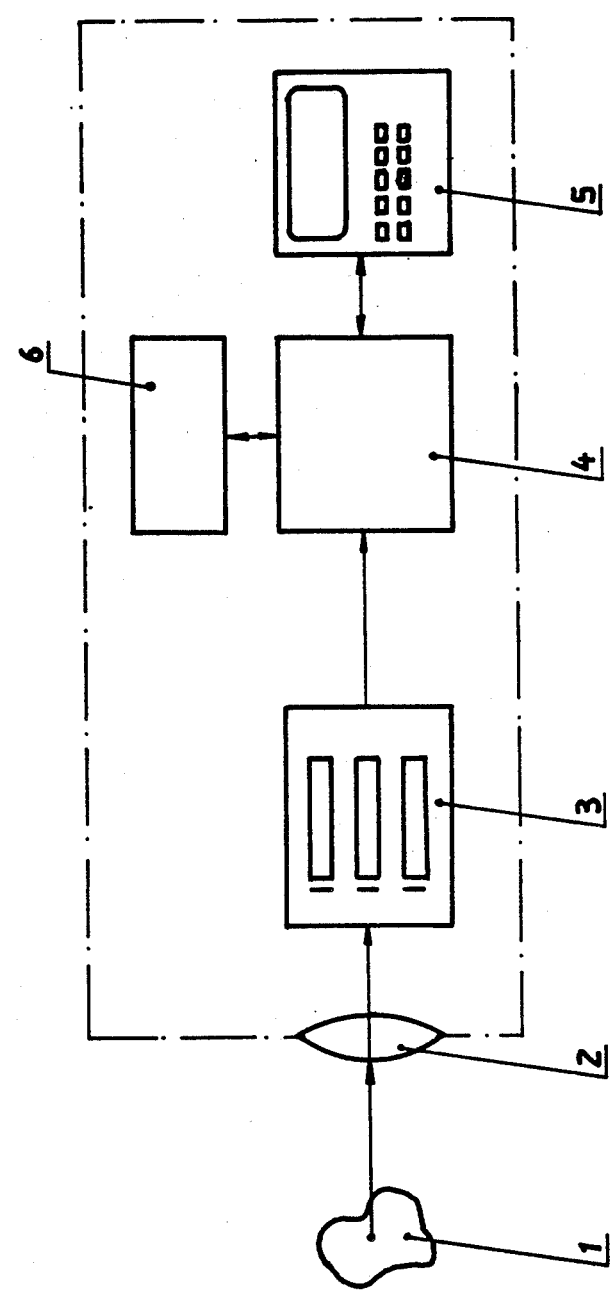

FIG. 1 is a graph showing the difference $U_{oj}-U_{uj}$ as a function of the temperature of a black-body radiator and FIG. 2 is a block diagram of an arrangement in accordance with the invention.

The thermal radiation of a test object 1 passes through an infrared optical system 2 and reaches the $n=3$ channels of a multi-channel alternating light pyrometer 3. The spectral signal voltages $U_j$ are measured at the outputs of the channels. After an analog/digital conversion (not shown), the $U_j$ are supplied to a control computer 4. The control computer 4 is coupled with a nonvolatile RAM 6 and one or several conventional dialog units 5. In RAM 6, user-specific functional relationships between the signal voltages $U_{ij}$ and the differences $U_{oj}-U_{uj}$ for $i=10$ surfaces, differing in emissivity, are stored. As is customary, the spectral signal voltages $U_{oj}-U_{uj}$ at the surface temperature $T_o$ and the ambient temperature $T_u$ at the black-body radiator, calibrated using a black-body radiator, is stored in the ROM of the control computer. The storage of the calibration values for the black-body radiator calibration line in the ROM is carried out in the plant. The emissivities are determined and stored in the nonvolatile RAM by the user in accordance with his measurement problem.

For measuring the temperature of an object with unknown emissivities, the $n=3$ voltages $U_1 \ldots U_3$ are measured first of all. In accordance with equation 2, 30 hypothetical voltages are determined for the 30 emissivities $\epsilon_{ij}$ stored for the 10 materials. In accordance with the calibration lines stored in the ROM, the temperature values $T_{oi1}$, $T_{oi2}$ and $T_{oi3}$ correspond to each line $U_{oi1}$, $U_{oi2}$, $U_{oi3}$ in the matrix of these voltage values.

In a variant of the example of the operation, all of these values are printed out and compared line for line with one another. If the values of a line lie very close together, then it can most probably be assumed that the true object temperature was determined with them and that it is a question of a material, which corresponds to this line.

In a second variant, in order to increase the reliability of the information, the respective average value $T_{oi}$ is determined from the $T_{oij}$ of each line and the $U_{oij}$, corresponding to the average value, is determined using the calibration lines that are stored in the ROM. The scatter of the voltages $$S_1 = \frac{1}{n} \sum_{j=1}^{n} (U_{oij} - U_{uj})^2 \text{ for } n = 3$$

is then calculated line by line and the smallest scatter is determined by comparing all io values. The average temperature $T_{oi}$, belonging to this line, is assumed to be the true temperature, the reliability of this information being higher than that of the first variant.

Since the temperature of an object, the spectral emissivity of which was not calibrated, can by all means be measured, the smallest scatter $S_i$, determined according to the second variant, is compared with a threshold value in a third variant in order to increase the reliability further. If the smallest scatter is greater than this threshold value, the material is regarded as not calibrated.

I claim:

1. A pyrometric measuring method for determining the temperature $T_o$ of surfaces with different emissivities $\epsilon_{ij}$ at $j=1$ to n effective wavelengths by the measurement of the spectral signal voltages $U_j$ in $j=1$ to n spectral channels at a known ambient temperature $T_u$ and by means of a functional relationship between the signal voltage difference $U_{oj}-U_{uj}$ and the object temperature of a black-body radiator, said relationship being measured in a calibration process, comprising measuring at a known surface temperature $T_o$ the respective signal voltages $U_{ij}$ in the $j=1$ to n spectral channels for $i=1$ to m user-specific surface materials i differing in emissivity, wherein n and m are integers and, using the functional relationship between the difference $U_{oj}-U_{uj}$ and the object temperature that is calibrated on a black-body radiator, determining the associated signal voltage differences $U_{oj}-U_{uj}$ and calculating the respective emissivities $\epsilon_{ij}$ for the user-specific $i=1$ to m surface materials according to the equation $$\epsilon_{ij} = \frac{U_{ij}}{U_{oj} - U_{uj}}$$

and storing them, measuring, in a measurement step on the unknown surface material i and at an unknown surface temperature $T_o$, the spectral signal voltage $U_j$ in the $j=1$ to n spectral channels, determining for each spectral signal voltage $U_j$ obtained in the measurement step, the signal voltage differences $U_{oij}-U_{uj}$ at the calibrated surface materials i according to the equation $$U_{oij} - U_{uj} = U_j / \epsilon_{ij}$$

using the stored emissivity $\epsilon_{ij}$, determining with the help of the functional relationship between the surface temperature $T_o$ and the difference $U_{oj}-U_{uj}$ in the respective spectral channel j as calibrated at the black-body radiator, the associated object temperatures $T_{oij}$ for each material i, using the previously determined differences $U_{oij}-U_{uj}$ for the differences $U_{oj}-U_{uj}$ obtained at the black-body radiator, and determining the scatter of the object temperatures $T_{oij}$ for each material i in the $j=1$ to n spectral channels, the average value of the n object temperatures $T_{oij}$, which have the least scatter for a material i, corresponding to the true object temperature $T_o$.

2. The pyrometric measuring method of claim 1, wherein the average value of the n object temperatures $T_{oij}$, which have the least scatter for a material i, this scatter being less than a previously fixed threshold value, corresponds to the true object temperature $T_o$.

3. A multichannel pyrometer with $j=1$ to n spectral channels, comprising a control computer in which functional relationships between the spectral signal voltage differences $U_{oj}-U_{uj}$ and the surface and ambient temperatures, as calibrated at a black-body radiator, are stored, and further comprising at least one dialogue unit for the determination of the temperature of $i=1$ to m surfaces with different emissivities, and a non-volatile RAM containing the functional relationships between the spectral voltages $U_{ij}$ and the difference $U_{oj}-U_{uj}$ for a discrete number $i=1$ to m of surfaces, which are typical for the user and differ in emissivity, coupled to the control computer, wherein n and m are integers.

* * * * *